United States Patent
Okuda et al.

(10) Patent No.: US 6,797,045 B2
(45) Date of Patent: Sep. 28, 2004

(54) SCRUBBER

(75) Inventors: Kazutaka Okuda, Kanagawa (JP); Kohtaro Kawamura, Tokyo (JP); Takeshi Tsuji, Kanagawa (JP); Yuji Shirao, Kanagawa (JP); Yoshihiro Ueda, Tokyo (JP)

(73) Assignee: Ebara Corporation, Tokyo (JP)

( * ) Notice: Subject to any disclaimer, the term of this patent is extended or adjusted under 35 U.S.C. 154(b) by 53 days.

(21) Appl. No.: 10/290,315

(22) Filed: Nov. 8, 2002

(65) Prior Publication Data

US 2003/0089241 A1 May 15, 2003

(30) Foreign Application Priority Data

Nov. 9, 2001 (JP) ........................................ 2001-344239

(51) Int. Cl.[7] ............................................ B01D 47/16
(52) U.S. Cl. ............................. 96/282; 96/286; 96/360
(58) Field of Search .......................... 95/218; 96/281, 96/282, 285, 286, 360

(56) References Cited

U.S. PATENT DOCUMENTS

| | | | | |
|---|---|---|---|---|
| 888,092 A | * | 5/1908 | Kestner | 261/90 |
| 1,408,736 A | * | 3/1922 | Hernu | 96/282 |
| 3,235,235 A | | 2/1966 | Umbricht et al. | |
| 3,371,470 A | * | 3/1968 | Bullock | 96/286 |
| 3,596,885 A | * | 8/1971 | Stone | 261/84 |
| 3,824,768 A | * | 7/1974 | Van Diepenbroek | 96/265 |
| 3,875,679 A | * | 4/1975 | Condit | 34/75 |
| 4,157,249 A | * | 6/1979 | Namy | 96/282 |
| 4,289,506 A | * | 9/1981 | Stone | 95/217 |
| 4,479,816 A | * | 10/1984 | Ganter | 96/282 |
| 5,076,818 A | * | 12/1991 | Jonsson | 95/9 |
| 5,902,377 A | * | 5/1999 | Morgan | 95/218 |
| 6,010,559 A | * | 1/2000 | Morgan | 95/218 |
| 6,627,166 B1 | * | 9/2003 | Simon | 423/210 |
| 6,638,343 B1 | * | 10/2003 | Kawamura et al. | 95/218 |
| 2003/0089241 A1 | * | 5/2003 | Okuda et al. | 96/281 |

FOREIGN PATENT DOCUMENTS

| | | |
|---|---|---|
| EP | 1 142 621 | 10/2001 |
| GB | 1 047 863 | 11/1966 |
| GB | 1 048 921 | 11/1966 |
| GB | 1 220 135 | 1/1971 |

* cited by examiner

Primary Examiner—Duane S. Smith
(74) Attorney, Agent, or Firm—Wenderoth, Lind & Ponack, L.L.P.

(57) ABSTRACT

A scrubber including a casing having an exhaust gas inlet and an exhaust gas outlet. An impeller is mounted in the casing, and the impeller is rotatable about its own axis. An exhaust gas can be introduced into the center of the impeller through the exhaust gas inlet of the casing. A cleaning liquid discharge nozzle is positioned at the center of the impeller for spraying a cleaning liquid in the impeller. Also, a baffle member is spaced apart from and surrounds the impeller. A mixture of the exhaust gas and the cleaning liquid exiting the impeller impinges on the baffle member. The cleaning liquid discharge nozzle is provided inside and rigidly connected to the impeller so as to rotate together with the impeller. The nozzle has a plurality of cleaning liquid discharge orifices extending radially through a cylindrical wall thereof to discharge a cleaning liquid into the impeller.

4 Claims, 4 Drawing Sheets

SCRUBBER

BACKGROUND OF THE INVENTION

This invention relates to a scrubber for efficiently removing dust from an exhaust gas.

In the production of semiconductors and liquid crystal displays (LCD panels), harmful and inflammable gases are used. Such gases may include silane ($SiH_4$) or halogen gases ($NF_3$, $CLF_3$, $SF_6$, $CHF_3$, $C_2F_6$, $CF_4$ and the like). Before being exhausted into the atmosphere, such gases must first be made harmless by being treated in an exhaust gas treating system, such as is shown in FIG. 1.

The exhaust gas treating system shown in FIG. 1 comprises an exhaust gas treatment apparatus 1, with an attached scrubber 20. An exhaust gas G containing $SiH_4$ and the like is introduced to a burner 3 of the apparatus 1 in which a flame 4 is generated to heat the gas G and thereby make it innocuous. The resultant gas contains a dust comprised of micro particles in high density, having a size of around 1 μm or less. The gas containing the micro dust particles is then cooled with a coolant 6, such as water, sprayed from a nozzle 5 in a liquid atomizing area 2, and is then introduced into the scrubber 20. The coolant that has been used to cool the gas is discharged through a U-shaped drain pipe 7.

The scrubber 20 comprises a casing 21; an impeller 23 positioned at a central portion of the casing 21, and rotated by a high speed rotation motor 22; and a cylindrical cleaning liquid discharge nozzle 25 positioned at the center of the impeller 23 for spraying a cleaning liquid 24 such as water. Micro dust particles within the exhaust gas are agitated in the rotating impeller 23 together with the cleaning liquid 24 sprayed from the cylindrical cleaning liquid discharge nozzle 25, to be absorbed into the cleaning liquid 24. Cleaning liquid with micro dust particles absorbed therein is discharged through a U-shaped drain pipe 26. The exhaust gas G exiting the impeller is passed through a mist collector 27 and then emitted into the atmosphere through an exhaust gas outlet 28.

However, such a scrubber generally has a low capability of removal of micro-dust, and is able to remove only around 20% to 60% of micro dust particles contained in a gas from the gas.

SUMMARY OF THE INVENTION

In accordance with the present invention, there is provided a scrubber comprising: a casing having an exhaust gas inlet and an exhaust gas outlet; an impeller mounted in the casing, and which is rotated about its own axis, an exhaust gas introduced into the center of the impeller through the exhaust gas inlet of the casing; a cleaning liquid supply nozzle positioned at the center of the impeller to spray a cleaning liquid in the impeller; and, a baffle member spaced apart from and surrounding the impeller on which a mixture of the exhaust gas and the cleaning liquid exiting the impeller impinges. In the scrubber, the baffle enhances agitation of the exhaust gas and the cleaning liquid and atomization of the cleaning liquid, whereby dust particles contained in the exhaust gas are efficiently absorbed into the cleaning liquid and thus a rate of removal of the dust particles from the exhaust gas increases.

Specifically, the baffle member comprises a circular plate member spaced apart and surrounding the impeller and a plurality of protrusions provided on and protruding from the circular plate member towards the impeller. The protrusions may be designed to extend in a direction parallel to the axis of the impeller and have a triangular cross section as viewed in a plane perpendicular to the axis of the impeller. The protrusions are spaced apart from each other in a circumferential direction of the circular plate member.

The casing has an upper wall in which the exhaust gas outlet is formed, the impeller is set in the casing such that its axis extends in a horizontal direction. The circular plate of the baffle member is positioned coaxially with the impeller, and is formed to have an exhaust gas exit opening for discharging the exhaust gas outside the circular plate. The exhaust gas exit opening is preferably positioned so that the exhaust gas exiting the exhaust gas exit opening is forced to be turned at an acute angle to move towards the exhaust gas outlet of the casing.

In accordance with an aspect of the present invention, a cylindrical cleaning liquid discharge nozzle is positioned inside and rigidly connected to the impeller and extends in the direction of the axis of the impeller, so that the cylindrical cleaning liquid discharge nozzle is rotated together with the impeller. The cylindrical cleaning liquid discharge nozzle has a cylindrical wall which defines a cylindrical chamber has a plurality of cleaning liquid discharge orifices extending radially through the cylindrical wall. A cleaning liquid supply pipe is fluidly connected to the chamber of the cylindrical cleaning liquid discharge nozzle to supply a cleaning liquid into the chamber. The cleaning liquid is discharged from the rotating cylindrical cleaning liquid discharge nozzle through the orifices to form particles thereof.

Further objects and advantages of the present invention will be apparent from the following description made with reference to the accompanying drawings showing a preferred, embodiment of the present invention.

DETAILED DESCRIPTION OF THE INVENTION

Figure 1:
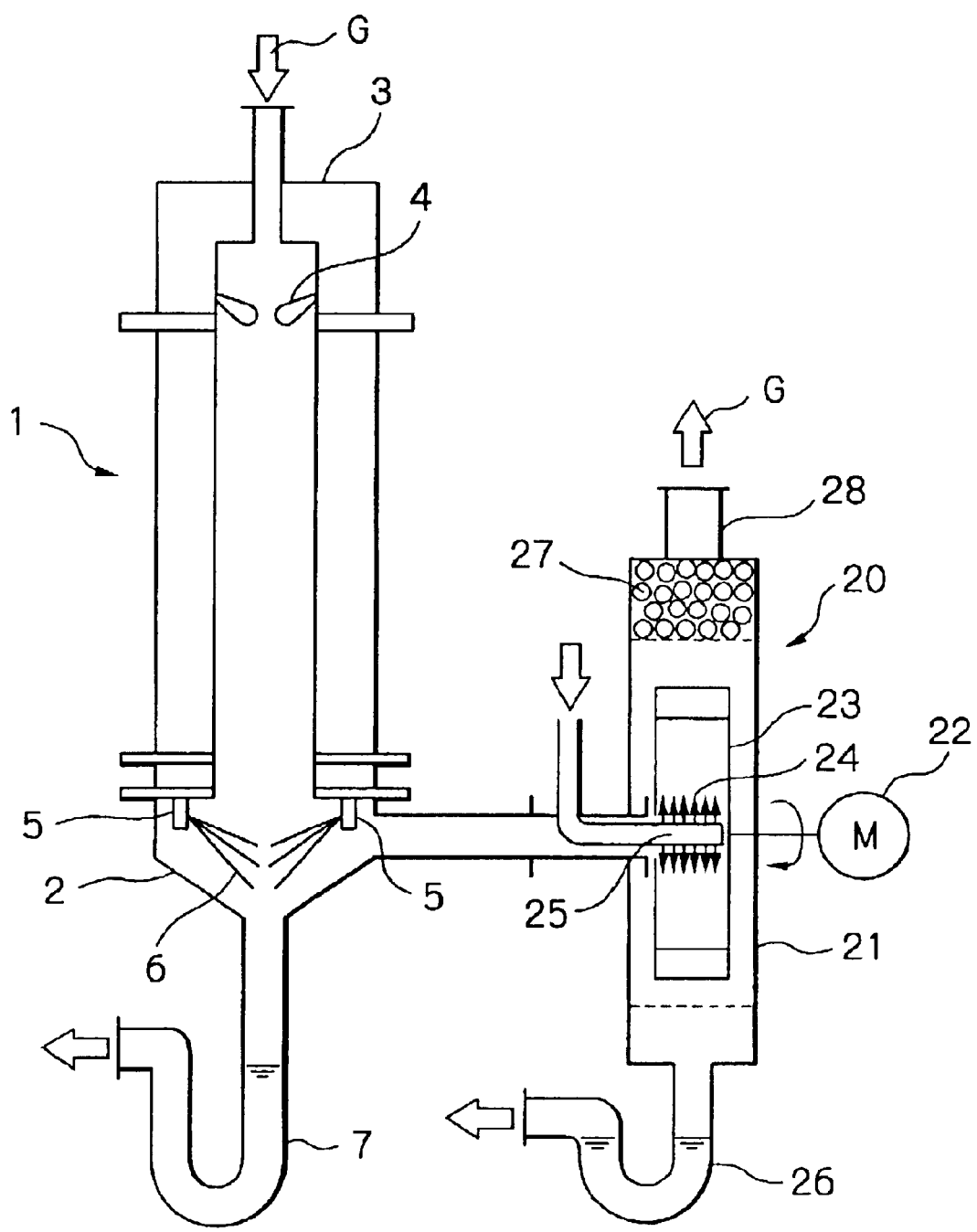
FIG. 1 is a schematic view of an exhaust gas treating system to which the present invention is applied.
Figure 2:
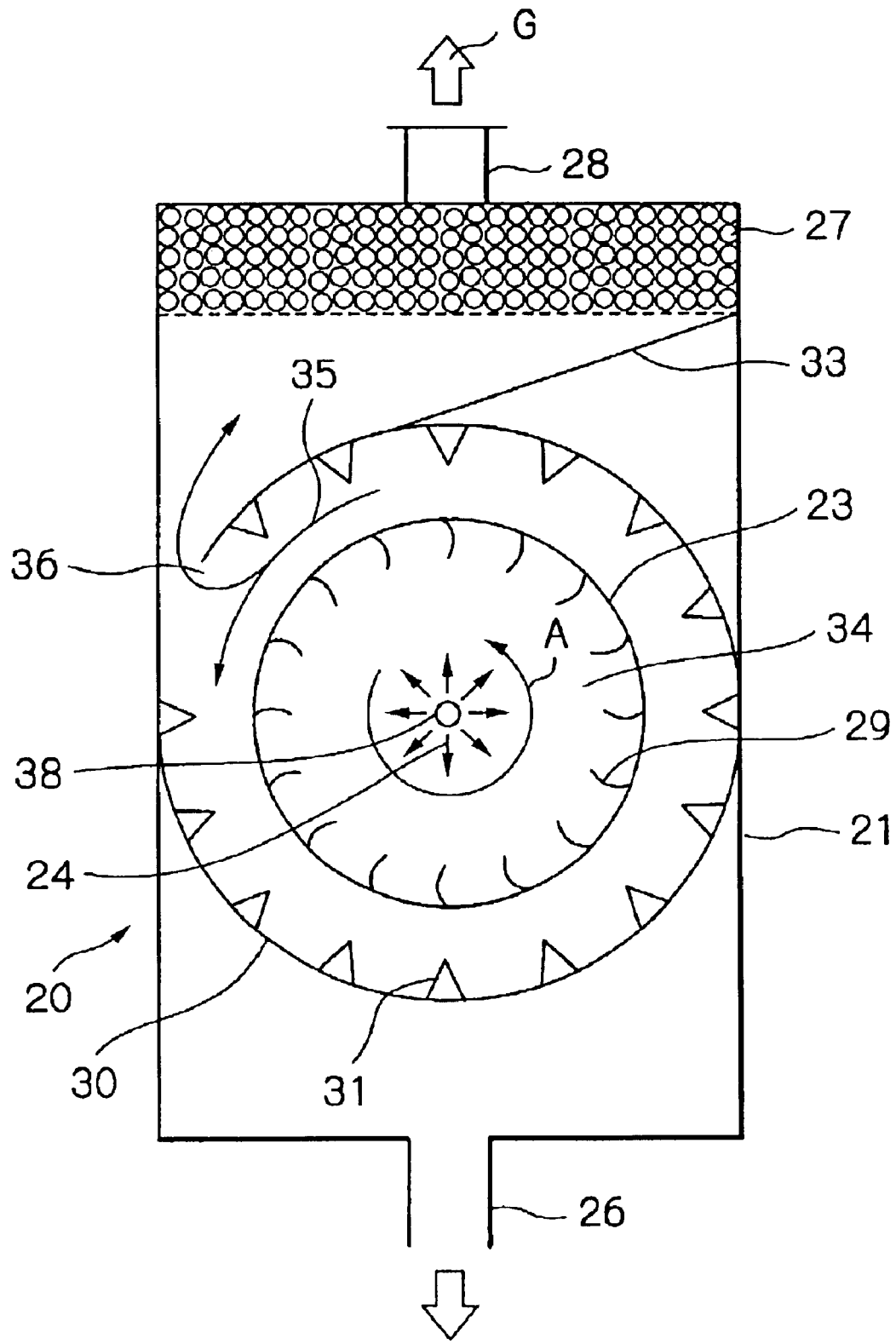
FIG. 2 is a schematic cross-sectional view of a scrubber according to an embodiment of the present invention.

An embodiment of the present invention will now be explained with reference to the drawings. Like parts or members appearing in FIG. 1 and FIGS. 2–4 are denoted by like reference numerals. FIG. 2 shows a schematical cross sectional view of a scrubber 1 in accordance with the present invention. As shown, the scrubber comprises a casing 21 having an exhaust gas inlet, for receiving an exhaust gas from the exhaust gas treatment apparatus as shown in FIG. 1, and an exhaust gas outlet 28; an impeller 23 provided inside the casing 21 and adapted to be rotated in a direction A; and a cylindrical cleaning liquid discharge nozzle 38 provided at the center of the impeller for discharging a cleaning liquid 24 radially outwardly in the impeller. The scrubber 1, further as shown in FIG. 2, comprises a circular baffle plate 30 securely provided inside the casing 21 to extend around the impeller 23 with a uniform space therebetween, the baffle plate having an exhaust gas exit opening 36 at the left upper side thereof; a mist collector 27 for collecting mist of the cleaning liquid entrained by an exhaust gas, which exits the exhaust gas exit opening 36 of the baffle plate and passes through the mist collector 27 to finally exit the exhaust gas outlet 28 of the casing; and a slanted plate 33 extending between the baffle plate and the mist collector in the manner as shown.

Figure 3:
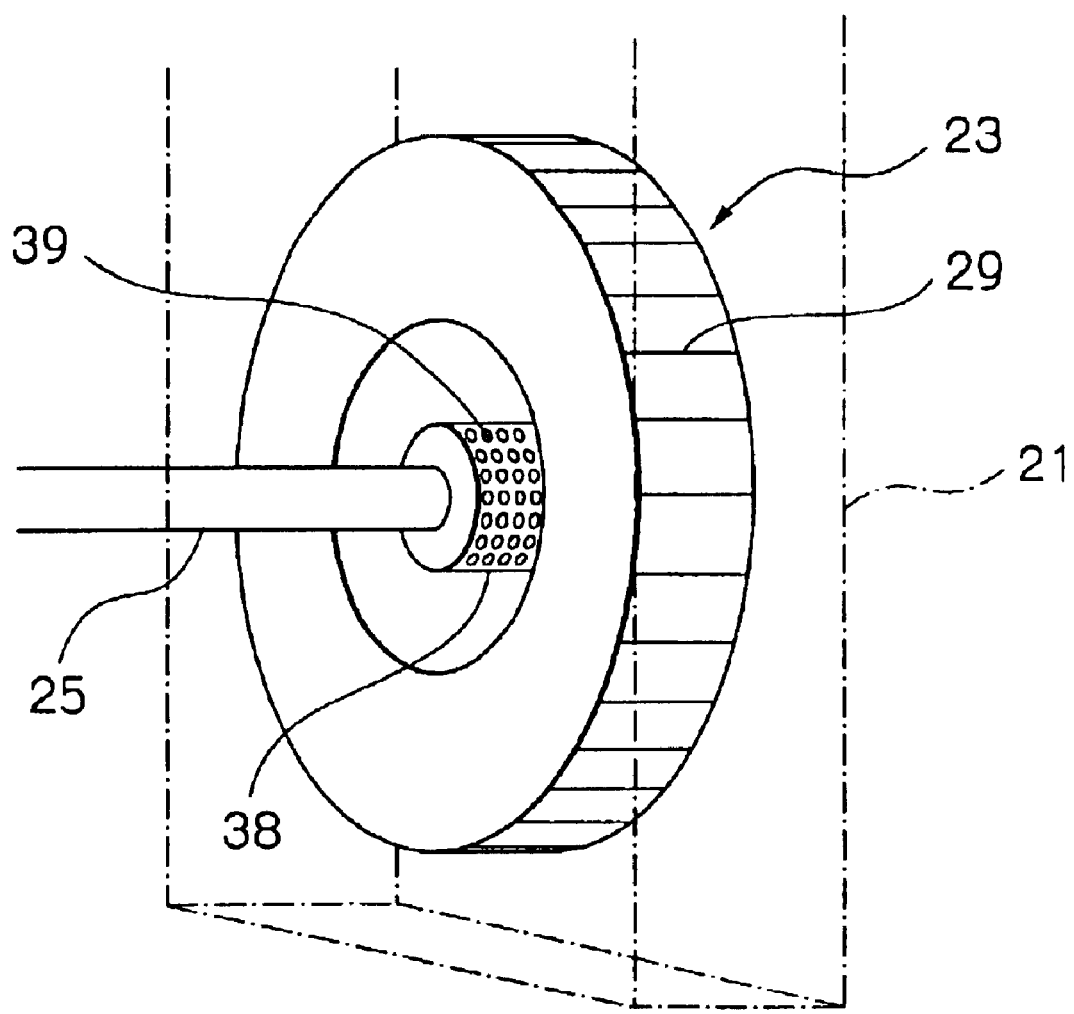
FIG. 3 is a perspective view of an impeller of the scrubber shown in FIG. 2.
Figure 4:
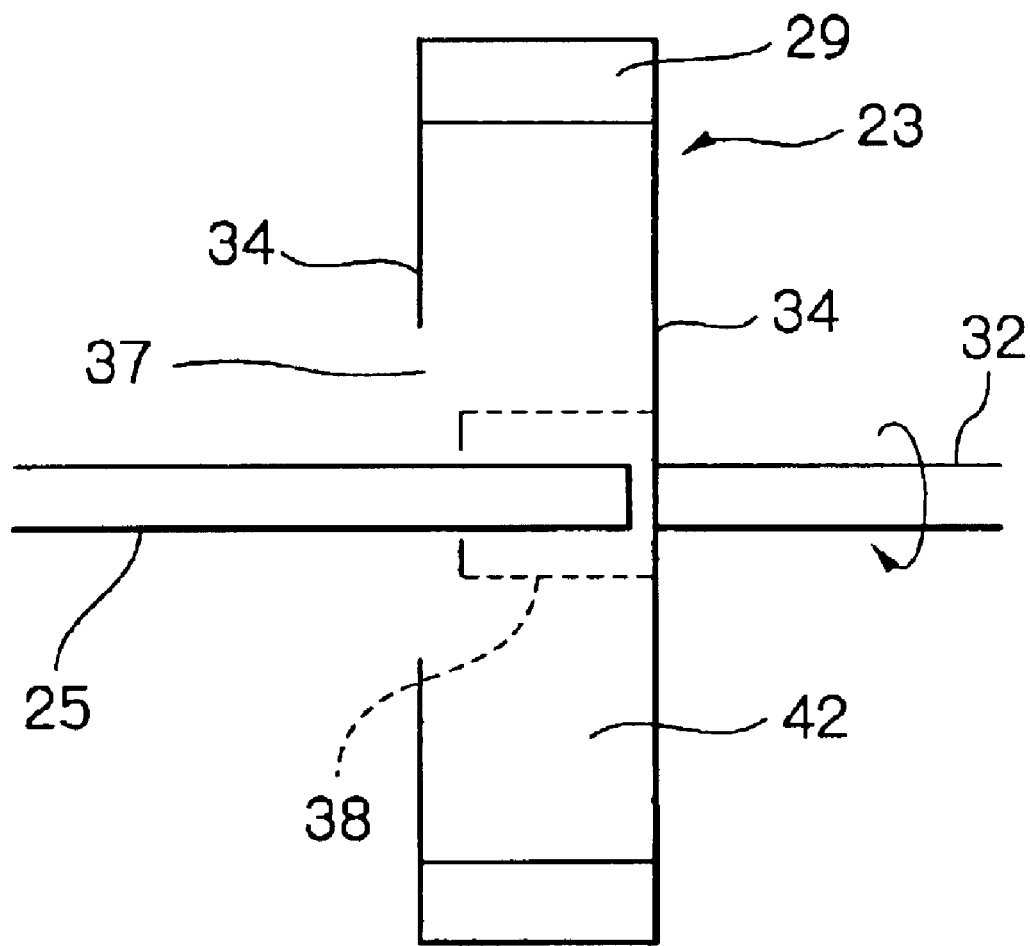
FIG. 4 is a schematic longitudinal-sectional view of the impeller shown in FIG. 3.

As shown in FIGS. 3 and 4, the impeller 23 has a pair of parallel side plates 34, specifically, a right-side disc-like side plate and a left-side ring-like side plate; and a plurality of impeller blades 29 provided between and secured to the side plates 34 in such a manner that they are equally spaced apart from each other at regular intervals along the outer periphery of the side plates 34. An output or drive shaft 32 of a motor is securely and coaxially connected to the center of the right side plate 34 to drivingly rotate the impeller 23. The left side plate 34 has an exhaust gas inlet opening 37 adapted to be fluidly connected to and receive a micro-particle dust-containing exhaust gas from an exhaust gas treatment apparatus as shown in FIG. 1.

The cylindrical cleaning liquid discharge nozzle 38 has a cylindrical body connected at its right end to the right side 34 of the impeller 23. The cylindrical nozzle body has a left side end wall that is provided with a central opening for permitting a tip end of a cleaning liquid supply tube 25 to pass therethrough without any interference therebetween, thereby enabling the cylindrical cleaning liquid discharge nozzle 38 to freely rotate together with the impeller 23. The cylindrical wall of the cylindrical cleaning liquid discharge nozzle 38 is provided with a plurality of orifices 39, through which a cleaning liquid supplied by the cleaning liquid supply tube 25 is discharged radially outwardly.

The baffle plate 30 is provided with a plurality of elongate protrusions 31, which extend in a direction parallel to the axis of the impeller 23, and which, as viewed in a plane normal to that axis, have a triangular cross section. The protrusions 31 are spaced apart from each other at regular intervals in the circumferential direction of the baffle plate 30.

In operation, as shown in FIG. 1, the impeller 23 is rotated by the motor through the output shaft 32 thereof, while an exhaust gas containing micro dust particles is introduced from the exhaust treatment apparatus, and, simultaneously, the cleaning liquid 24 is supplied to the gas through the orifices 39 of the cylindrical cleaning liquid discharge nozzle 38. Since, as stated above, the nozzle 38 is rotated together with the impeller 23, the cleaning liquid 24 supplied into the impeller forms particles. Due to the rotation of the impeller 23, the micro dust particle-containing exhaust gas and the cleaning liquid 24 in the form of particles are agitated so as to be mixed with each other so that micro dust particles in the exhaust gas are efficiently absorbed into the cleaning liquid. Most of the cleaning liquid 24 with the micro dust particles absorbed therein is gathered at the bottom of the casing 21 and discharged from a drain pipe 26 connected to the bottom of the casing 21, while any remaining cleaning liquid in the form of particles is entrained in the exhaust gas and exits the impeller 23 towards the exhaust gas outlet 28 at the top of the casing 21.

In the present invention, as stated above, the baffle plate 30 is provided around the impeller 23. Therefore, an exhaust gas, which contains particles of the cleaning liquid 24, upon exiting the impeller 23 collides against the baffle plate 30 and the protrusions 31 thereof, whereby the exhaust gas is further agitated, and any relatively large cleaning liquid particles contained in the exhaust gas are atomized as a result of the collision of the cleaning liquid 24 against the baffle plate 30 and the protrusions 31. As a result, the exhaust gas and the cleaning liquid are further mixed with each other so that micro dust particles, which have not yet been absorbed into the cleaning liquid, are additionally absorbed into the cleaning liquid.

As stated above, the exhaust gas exit opening 36 is positioned at the left upper side of the circular baffle plate 30, whereby the exhaust gas exiting from the exhaust gas exit opening 36 is forced to change its direction of movement at an acute angle. As a result, some of the cleaning liquid particles entrained in the exhaust gas leave the flow of the exhaust gas and descend and reach the bottom of the casing 21 of the scrubber 20 to exit the cleaning liquid drain pipe 26. Accordingly, an amount of the cleaning liquid reaching the mist collector is reduced, which results in a reduction of a load imposed on the mist collector 27, and therefore reduces a load imposed on the motor used to drive the impeller 23 to cause the exhaust gas to flow through the mist collector 27.

As can be seen from the forgoing, the present invention provides a scrubber that is able to both efficiently and effectively remove micro dust particles from an exhaust gas.

Although a specific embodiment of the present invention has been described in the foregoing, it should be understood that the present invention is not limited to this embodiment, and a variety of modifications and changes are possible within the spirit and scope of the present invention.

What is claimed is:

1. A scrubber comprising:
   a casing having an exhaust gas inlet and an exhaust gas outlet;
   an impeller mounted in the casing, the impeller being rotatable about its own axis, wherein an exhaust gas is introduced into the center of the impeller through the exhaust gas inlet of the casing;
   a cleaning liquid discharge nozzle, positioned at the center of the impeller, for spraying a cleaning liquid in the impeller; and
   a baffle member spaced apart from and surrounding the impeller such that a mixture of the exhaust gas and the cleaning liquid exiting the impeller impinges on the baffle member,
   wherein the baffle member comprises a circular plate member spaced apart from and surrounding the impeller and a plurality of protrusions provided on and protruding from the circular plate member towards the impeller.

2. A scrubber as set forth in claim 1, wherein the protrusions extend in a direction parallel to the axis of the impeller and have a triangular cross section as viewed in a plane perpendicular to the axis of the impeller, the protrusions being spaced apart from each other in a circumferential direction of the circular plate member.

3. A scrubber as set forth in claim 2, wherein:
   the casing has an upper wall in which the exhaust gas outlet is formed;
   the impeller is set in the casing such that its axis extends in a horizontal direction; and the circular plate of the baffle member is positioned coaxially with the impeller, and is formed to have an exhaust gas exit opening for discharging the exhaust gas outside the circular plate, the exhaust gas exit opening being positioned so that the exhaust gas exiting the exhaust gas exit opening is forced to be turned at an acute angle to move towards the exhaust gas outlet of the casing.

4. A scrubber as set forth in claim 3, wherein:

the cleaning liquid discharge nozzle comprises a cylindrical wall positioned inside and rigidly connected to the impeller and extends in the direction of the axis of the impeller, the cylindrical wall defining a cylindrical chamber and having a plurality of cleaning liquid discharge orifices extending radially therethrough; and the scrubber further comprises a cleaning liquid supply pipe fluidly connected to the cylindrical chamber of the cleaning liquid discharge nozzle to supply a cleaning liquid into the cylindrical chamber.

* * * * *